United States Patent [19]
Milat

[11] Patent Number: 4,795,210
[45] Date of Patent: Jan. 3, 1989

[54] PORTABLE TABLE FOR USE IN VEHICLES

[76] Inventor: Lloyd E. Milat, 8422 Forest Point Dr., Humble, Tex. 77338

[21] Appl. No.: 123,365

[22] Filed: Nov. 20, 1987

[51] Int. Cl.$^4$ .............................................. A47C 7/62
[52] U.S. Cl. ................................... 297/194; 297/188; 108/43; 248/311.2; 248/558; 211/69.5
[58] Field of Search ............... 297/194, 145, 188, 467; 248/311.2, 558; 211/69.5; 108/43, 49, 24

[56] References Cited

U.S. PATENT DOCUMENTS

| | | | |
|---|---|---|---|
| 929,461 | 7/1909 | Munn | 211/69.5 X |
| 2,701,006 | 2/1955 | Kandariun | 297/188 X |
| 2,808,191 | 10/1957 | Cramer | 108/43 X |
| 3,304,143 | 2/1967 | Connell | 297/194 X |
| 3,318,456 | 5/1967 | Lipe | 297/194 X |
| 3,323,656 | 6/1967 | Weiss et al. | 108/42 X |
| 3,476,257 | 11/1969 | O'Connell | 211/69.5 X |
| 3,491,705 | 1/1970 | Blanke | 108/49 |
| 3,596,986 | 8/1971 | Ragsdale | 297/467 X |
| 4,213,649 | 7/1980 | Sell | 248/311.2 X |
| 4,512,503 | 4/1985 | Gioso | 297/194 X |

FOREIGN PATENT DOCUMENTS

| | | | |
|---|---|---|---|
| 2029198 | 3/1980 | United Kingdom | 108/42 |
| 8201983 | 6/1982 | World Int. Prop. O. | 108/43 |

Primary Examiner—Kenneth J. Dorner
Assistant Examiner—Laurie K. Cranmer
Attorney, Agent, or Firm—Jerry T. Kearns

[57] ABSTRACT

A portable table for use in automobiles has a rectangular planar table top surrounded by upstanding sides. A crayon supporting block and a cup receiving aperture are provided on the table top. The table top is designed to be supported by a pair of attached legs. The legs may have a contoured bottom corresponding to the contour of an automobile seat. By selectively utilizing one short straight bottomed leg and one contoured bottom long leg, the portable table may be supported on a backseat armrest in an automobile. Aligned slots through each leg receive an automobile seatbelt to secure the table on a car seat. An adjustable strap is provided to secure the table to an infant car seat when the seat belt is being used to secure the infant seat. A cup shelf secured to the table supports a cup in a level position, projecting through an opening in the table top.

5 Claims, 3 Drawing Sheets

PORTABLE TABLE FOR USE IN VEHICLES

BACKGROUND OF THE INVENTION

1. Field of the Invention

The present invention relates to portable tables for use in vehicles, and more particularly pertains to a new and improved portable table designed to be supported on an automobile seat. When traveling in an automobile, especially on long trips, the occupants of the automobile need to be provided with entertainment as well as refreshment. Children, especially, tend to grow restless and irritable on long automobile journeys. In order to provide amusement for children on long automobile trips, the parents bring various toys and entertainment devices along. However, it is difficult to provide a stable surface on which these entertainment devices may be utilized. Also, it has been a considerable problem to provide a secure and stable support for food and beverage items in an automobile. The present invention solves the aforesaid problems by providing a stable, portable, adjustable table for use in automobiles.

2. Description of the Prior Art

Various types of portable tables for use in vehicles are known in the prior art. A typical example of such a portable table for use in vehicles is to be found in U.S. Pat. No. 3,326,446, which issued to H. Goings on June 20, 1967. This patent discloses a portable car seat tray which is formed from a single sheet of folded cardboard. The tray has legs provided with a seat matching contour and also has receptacles for food and beverage containers. U.S. Pat. No. 3,632,158, which issued to A. Boothe on Jan. 4, 1972, discloses a console designed to be supported on a vehicle seat. U.S. Pat. No. 4,087,126, which issued to L. Wynn on May 2, 1978, discloses a console for van-type vehicles. The console is provided with receptacles for beverage containers. U.S. Pat. No. 4,341,304, which issued to H. Diller on July 27, 1982, discloses a tray for use by diesel truck mechanics, designed for receipt upon a tractor tire. The device includes a base comprising a rectangular box which is open at the bottom. Opposite ends of the base are contoured for receipt upon various tire sizes with the crown of the tire being received through the open bottom of the base. A tray with upstanding sidewalls is pivotally secured to the base. U.S. Pat. No. 4,341,418, which issued to A. Chappell on July 27, 1982, discloses a car seat table capable of being stored under a car seat. The table is constructed from three sections connected to one another by hinges. The table is held in an upside-down storage position by guide runners which are centrally positioned in alignment on each table section and which slides along a track mounted on the bottom of the car seat for storage. The tray is provided with a plurality of apertures for receiving beverage containers and has a flat table top portion with opposed upstanding sidewalls. U.S. Pat. No. 4,010,696, which issued to H. Priesman on Mar. 8, 1977, discloses a tray for use in an automobile which is fitted on its underside with folding legs, of a size which, when extended, mount the tray on the floor inside a vehicle over the hump of the transmission shaft. The tray has receptacles for accommodating food and beverage containers, and has a flat table top portion surrounded by upstanding sidewalls. U.S. Pat. No. 3,922,973, which issued to H. Sturgeon on Dec. 2, 1975, discloses a portable automobile desk for use in vehicles. The vehicle desk is provided with attaching brackets and straps to secure the desk to the wire frame of the underside of the seat.

While the above mentioned devices are suited for their intended usage, none of these devices provide a portable table for use in automobiles which may be selectively supported by a pair of long contoured bottom legs on a car seat, or by utilizing one flat bottomed short leg, be supported by a backseat armrest on either side of the automobile. Further, none of these prior art vehicle tables are provided with slotted legs for securement to an automobile seat by conventional automobile seatbelts. Additionally, none of these aforesaid tables provides a cup support shelf for maintaining a beverage container projecting through an aperture in the table top surface in a level position. Inasmuch as the art is relatively crowded with respect to these various types of portable tables for use in vehicles, it can be appreciated that there is a continuing need for and interest in improvements to such portable tables for use in vehicles, and in this respect, the present invention addresses this need and interest.

SUMMARY OF THE INVENTION

In view of the foregoing disadvantages inherent in the known types of portable tables for use in vehicles now present in the prior art, the present invention provides an improved portable table for use in vehicles. As such, the general purpose of the present invention, which will be described subsequently in greater detail, is to provide a new and improved portable table for use in vehicles which has all the advantages of the prior art portable tables for use in vehicles and none of the disadvantages.

To attain this, a representative embodiment of the concepts of the present invention is illustrated in the drawings and makes use of a flat rectangular table top surrounded by upstanding sidewalls. The present invention further provides a crayon holding block and a cup receiving aperture on the table top. A pair of spaced leg receiving slots are each adapted to receive either a short or a long leg. By selectively positioning the short or long legs, the table may be used on either the driver or passenger side of a two door vehicle. Another feature of the present invention is a cup supporting shelf which is positioned beneath the cup receiving aperture. The cup supporting shelf is adapted to be attached to the table in a position which will maintain a supported cup level, projecting through the top surface of the table top. An additional feature of the present invention is the use of a pair of aligned slots through the legs of the table for reception of a conventional automobile seatbelt, and an adjustable strap for securing the table to an infant car seat when the seatbelt is used to secure the infant car seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable table for use in vehicles which has all the advantages of the prior art portable tables for use in vehicles and none of the disadvantages.

It is another object of the present invention to provide a new and improved portable table for use in vehicles which may be easily and efficiently manufactured and marketed.

It is a further object of the present invention to provide a new and improved portable table for use in vehicles which is of a durable and reliable construction.

An even further object of the present invention is to provide a new and improved portable table for use in vehicles which is susceptible of a low cost of manufacture with regard to both materials and labor, and which accordingly is then susceptible of low prices of sale to the consuming public, thereby making such portable tables for use in vehicles economically available to the buying public.

Still yet another object of the present invention is to provide a new and improved portable table for use in vehicles which provides in the apparatuses and methods of the prior art some of the advantages thereof, while simultaneously overcoming some of the disadvantages normally associated therewith.

Still another object of the present invention is to provide a new and improved portable table for use in vehicles which may be selectively supported on a car seat or on an armrest on either the driver or passenger side of the vehicle.

Yet another object of the present invention is to provide a new and improved portable table for use in vehicles which will support a beverage container in a level position, projecting throught the top surface of the table top.

Even still another object of the present invention is to provide a new and improved portable table for use in vehicles which utilizes a pair of removable legs with aligned slots for reception of a conventional automobile seatbelt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
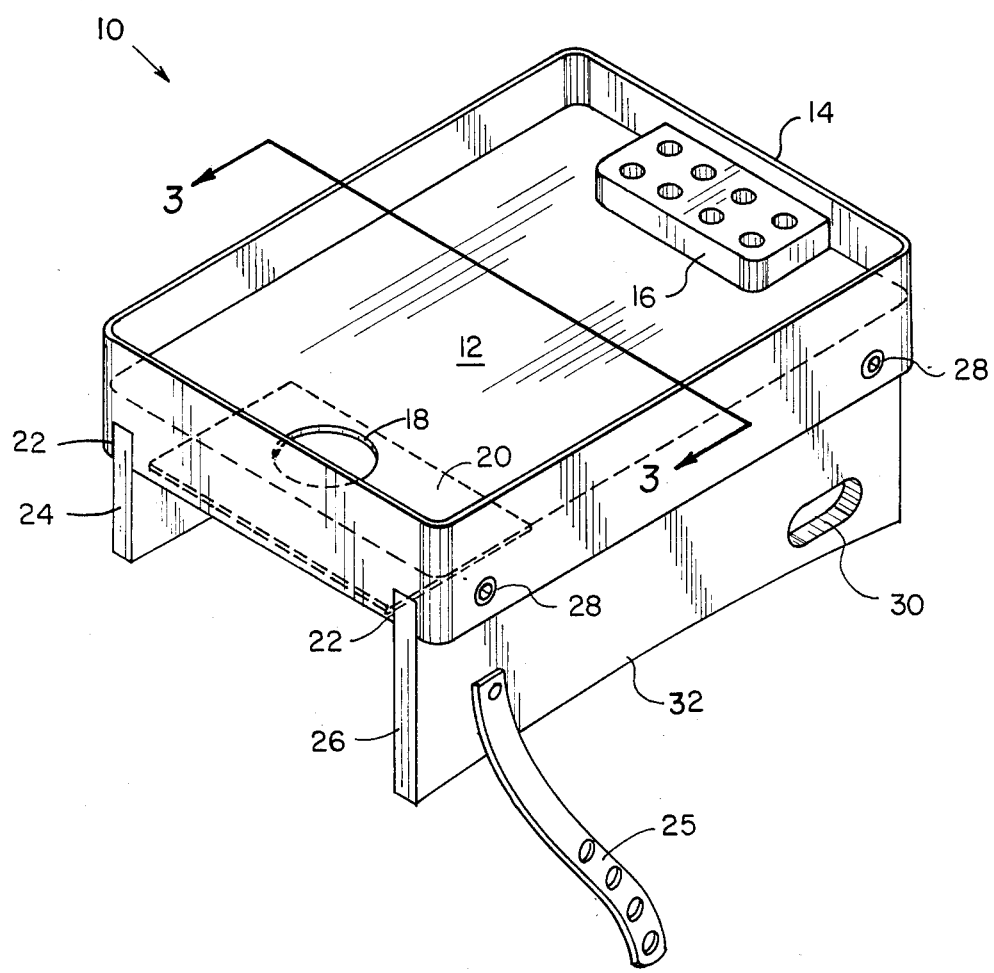
FIG. 1 is a perspective view of the portable table of the present invention with one short leg and one long leg mounted.

With reference now to the drawings, and in particular to FIG. 1 thereof, a new and improved portable table for use in vehicles embodying the principles and concepts of the present invention and generally designated by the reference numeral 10 will be described.

More specifically, it will be noted that the first embodiment 10 of the invention includes a flat rectangular table top portion 12 surrounded by four upstanding sidewalls 14. A crayon supporting block 16 is provided adjacent a top edge portion of the table top 12. A cup receiving aperture 18 is formed through the table top 12 adjacent a lower edge portion thereof. A cup support shelf 20 extends beneath the cup receiving aperture 18. A pair of opposed slots 22 are provided for the reception of a pair of legs 24 and 26. The legs are removably secured in the slots 22 by a pair of screws 28. By the use of a short leg 24 and a long leg 26, the portable table may be mounted on either the driver side or passenger side in the rear seat of an automobile, with the short leg 24 resting on the armrest. A slot 30 is provided through each of the legs 24 and 26 for the reception of a conventional automobile seatbelt. The seatbelt is passed through both of the aligned slots 30 and is buckled, thus securing the portable table 10 to the automobile seat. The bottom of the long leg 26 is provided with a contour 32 to match the contour of an automobile seat. The bottom of the short leg 24 is straight to rest flat on the vehicle armrest. An adjustable strap 25 is provided to secure the portable table to an infant car seat, when the vehicle seat belt is being utilized to secure the infant car seat.

Figure 2:
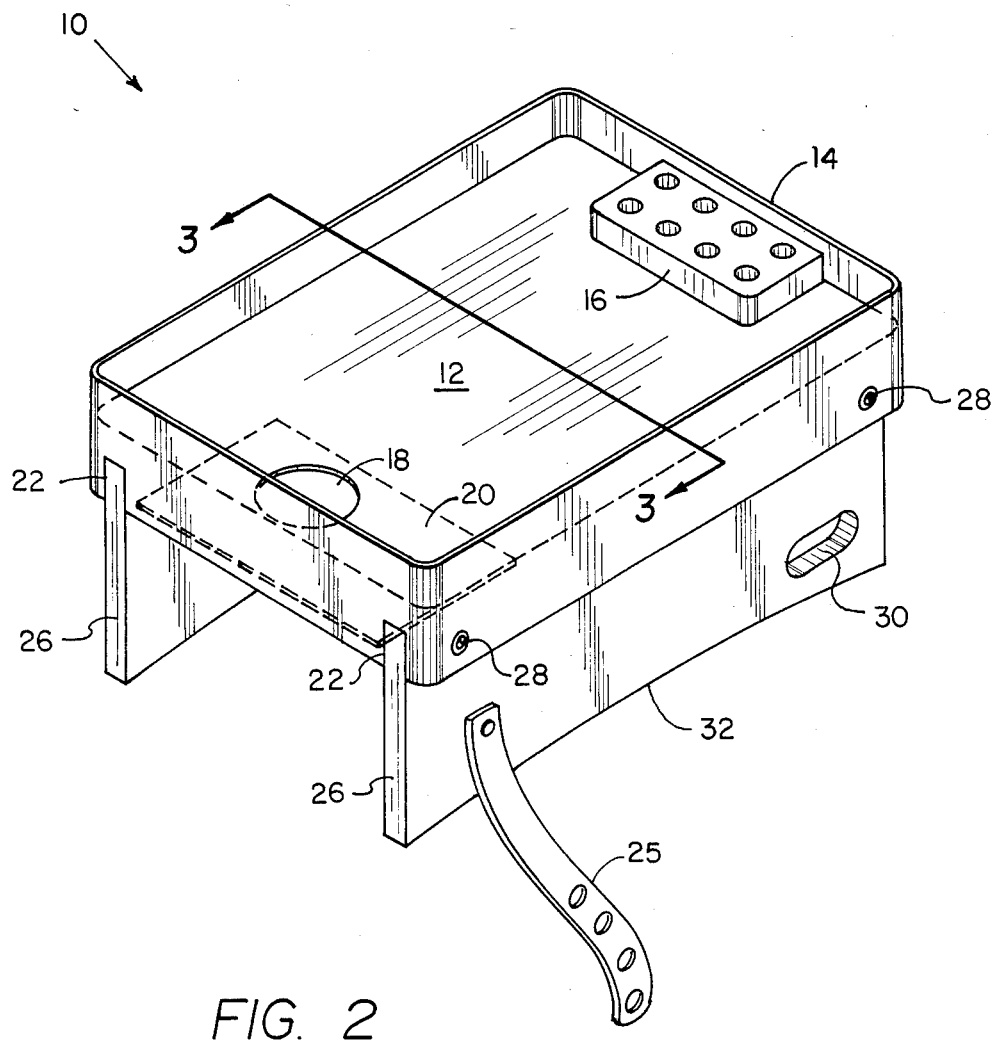
FIG. 2 is a perspective view of the portable table of the present invention with two long legs mounted.

With reference now to FIG. 2, the portable table 10 of the present invention is shown with two long legs 26 mounted. This results in the table top 12 being mounted in a level position, with the contoured bottom of the legs 26 resting on the vehicle seat. It will now be understood, that by reversing the position of the short 24 and long 26 legs in FIG. 1, that the table may be mounted on the opposite side of the two door vehicle. Thus, by selectively positioning the short and long legs, the portable table 10 of the present invention may be mounted on either the driver or passenger side in the back seat of a two door vehicle. By utilizing two long legs 26, the table may be supported in a level position with the contoured bottoms 32 of both legs 26 resting on the correspondingly contoured car seat.

Figure 3:
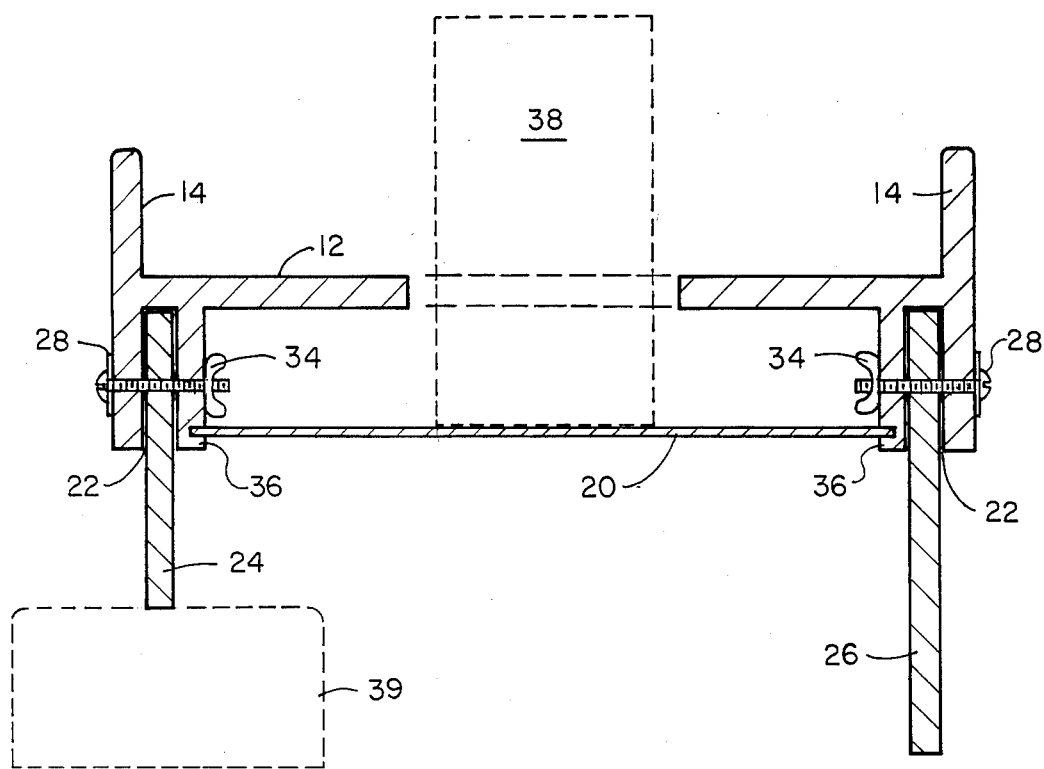
FIG. 3 is a cross sectional view of the portable table of the present invention taken along lines 3—3 of FIG. 1, and illustrating the cup support shelf.

With reference now to FIG. 3, it will be seen that the short 24 and long 26 legs are secured in a pair of slots 22 by screws 28 and wing nuts 34. It may now be clearly seen that the flat rectangular table top portion 12 is surrounded by upstanding sidewalls 14. A pair of cup supporting shelf mounting brackets in the form of channel blocks 36 for reception of an end of the cup support shelf 20 are provided on each side of the table, adjacent the slots 22. The channel blocks 36 are positioned at a distance from the table top 12 so that a cup 38 will be maintained in a horizontal position on the horizontally extending cup support shelf 20.

The portable table of the present invention is preferably constructed from a lightweight molded plastic. This allows the table top surface to be easily cleaned, and allows for easy portability of the table. It is contemplated that the portable table of the present invention will be marketed in a package including the table top portion 12, one short leg 24 and two long legs 26. This allows the user to select the desired configuration of the portable table 10 of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable table for use in vehicles, comprising:
   a flat rectangular planar table top;
   a raised block having a plurality of holes for holding crayons adjacent an upper top edge portion of said table top;
   four upstanding sidewalls surrounding said table top;
   a cup receiving aperture formed through said table top;
   a pair of opposed spaced slots formed beneath said table top;
   a pair of legs received in said slots;
   means for removably securing said legs in said slots;
   each of said legs having a bottom edge contour matching a car seat contour or having a straight bottom edge;
   a slot for receiving a vehicle seatbelt formed in each of said legs;
   a cup supporting shelf positioned beneath said cup receiving aperture; and
   means for removably securing opposite ends of said shelf to said table.

2. The portable table for use in vehicles of claim 1, wherein one of said pair of legs is a long leg and the other of said pair of legs is a short leg.

3. The portable table for use in vehicles of claim 2, further comprising a pair of cup support shelf channel brackets on opposite sides of said table, adjacent each of said leg mounting slots; and
   one end of said cup support shelf removably secured in each of said channel brackets, whereby said cup support shelf will be horizontally positioned when said table is mounted in a rear seat of a two door vehicle.

4. The portable table for use in vehicles of claim 1, wherein each of said pair of legs has an equal length.

5. The portable table for use in vehicles of claim 1, further comprising an adjustable strap on said table for securing said table to an infant car seat in a rear seat of a two door vehicle.

* * * * *